(12) United States Patent
Chapon et al.

(10) Patent No.: US 9,706,717 B2
(45) Date of Patent: Jul. 18, 2017

(54) ROUND BALER

(71) Applicant: Deere & Company, Moline, IL (US)

(72) Inventors: Emmanuel Chapon, Velet (FR); Mickael Zabe, Ougney (FR); Pascal Gresset, Auxon Dessous (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/182,077

(22) Filed: Jun. 14, 2016

(65) Prior Publication Data

US 2016/0366831 A1 Dec. 22, 2016

(30) Foreign Application Priority Data

Jun. 16, 2015 (DE) .................. 10 2015 210 998

(51) Int. Cl.
*A01F 15/08* (2006.01)
*A01F 15/07* (2006.01)
*A01F 15/18* (2006.01)

(52) U.S. Cl.
CPC .......... *A01F 15/0883* (2013.01); *A01F 15/07* (2013.01); *A01F 15/08* (2013.01); *A01F 15/085* (2013.01); *A01F 15/18* (2013.01); *A01F 2015/077* (2013.01)

(58) Field of Classification Search
CPC ............... A01F 15/07; A01F 2015/077; A01F 2015/0795; A01F 15/0883; A01F 15/08; A01F 15/085; A01F 15/18
USPC ........................................ 100/87, 88; 56/341
See application file for complete search history.

(56) References Cited

U.S. PATENT DOCUMENTS

| | | | |
|---|---|---|---|
| 4,334,467 A | 6/1982 | Nishibe et al. | |
| 4,370,848 A * | 2/1983 | Campbell | ........... A01F 15/0883 100/88 |
| 7,568,425 B2 * | 8/2009 | Viaud | ..................... A01F 15/07 100/87 |
| 2004/0000131 A1 * | 1/2004 | Viaud | ..................... A01F 15/07 56/341 |

FOREIGN PATENT DOCUMENTS

| | | |
|---|---|---|
| DE | 3920377 A1 | 1/1991 |
| DE | 10339652 A1 | 5/2005 |
| DE | 102005036181 A1 | 2/2007 |
| DE | 102007012174 A1 | 12/2008 |
| EP | 1264531 A1 | 12/2002 |

(Continued)

OTHER PUBLICATIONS

European Search Report in foreign counterpart application No. 16171873.9 dated Oct. 17, 2016 (7 pages).

*Primary Examiner* — Jimmy T Nguyen

(57) ABSTRACT

A round baler is provided with a bale-forming chamber and boundary apparatus of the bale-forming chamber that can be moved into an open position for ejecting a completed bale. The boundary apparatus includes a pivoting part rotatable between a first position, a second position and a third position. The axial dimensions of the bale-forming chamber can be changed by at least one side wall that can be moved by an adjustment drive. The adjustment drive is configured such that the axial dimensions of the bale-forming chamber increases when the pivoting part rotates to the second position and then reduces when the pivoting part rotates to the third position.

19 Claims, 2 Drawing Sheets

(56) References Cited

FOREIGN PATENT DOCUMENTS

| | | | |
|---|---|---|---|
| EP | 1364574 | A1 | 11/2003 |
| EP | 1396187 | A2 | 3/2004 |
| EP | 1969918 | A1 | 9/2008 |
| WO | 2014194287 | A2 | 12/2014 |

\* cited by examiner

ROUND BALER

CROSS-REFERENCE TO RELATED APPLICATIONS

Pursuant to 35 USC §119, this application claims the benefit of and priority to German patent application no. 102015210998.4, filed on Jun. 16, 2015, which is herein incorporated by reference in its entirety.

FIELD OF THE DISCLOSURE

The disclosure relates to a round baler and a boundary apparatus that can be moved into an open position for ejecting a completed bale.

BACKGROUND

Round balers are used to produce bales from stalk-shaped agricultural harvested produce. Such round balers have a bale-forming chamber and associated pressing means. After completion and optional wrapping of a bale with mesh, twine, or film, this bale is ejected toward the back out of the bale-forming chamber, after a rear door has been opened or a pivoting part holding a bale pressing element has been pivoted upward, in order to clear the path for the bale.

When leaving the bale-forming chamber, on one hand, the bale still has a not insignificant rotational energy from the bale-forming and optional wrapping process and, on the other hand, also gains kinetic energy while rolling out of the bale-forming chamber when it rolls down a rear-facing unloading ramp of the round baler. This kinetic energy can result in the bale rolling on the ground an undesired distance. In addition, it impacts the unloading ramp at a rather high speed, which could damage the wrapping material. The unloading ramp therefore is to be constructed with sufficient flexibility in the prior art in a rather complicated way in order to prevent this problem.

In the prior art (DE 103 39 652 A1), it has been proposed to attach a door to the rear side of the bale-forming chamber of the round baler, wherein this door can pivot about a vertical or approximately vertical pivoting axis and is used as a retaining device for the bale, in that it comes in contact with the end side of the ejected bale and brakes it. Such a door, however, also means additional costs and cannot influence the speed at which the bale reaches the unloading ramp, because the bale contacts the door only at a later time.

Furthermore, round balers have been described with side walls or side wall parts that move in the lateral direction, which are moved into an inner position during the forming of a bale and are moved outward for ejecting the bale, in order to reduce the friction forces of the bale during the ejection. Refer here to U.S. Pat. No. 4,334,467 A, DE 39 20 377 A1, DE 10 2005 036 181 A1, EP 1 264 531 A1, EP 1 364 574 A1, and EP 1 396 187 A2. When the bale is rolled out, the force exerted by the side walls on the bale is thus reduced by a relatively small value that does not lead to significant braking of the bale while it is rolling out and does not solve the mentioned problem.

According to DE 10 2007 012 174 A1, for the unloading process, the side wall is moved into a position in which a specified friction detected by sensors is produced. Here, greater costs for the controller are required, including an associated actuator for moving the side wall. The movement should guarantee an ejection of the bale, so that a significant braking effect also cannot be assumed here.

SUMMARY

The present disclosure provides a round baler in which the disadvantages mentioned above are not present or are present only to a reduced degree.

A round baler is equipped with a bale-forming chamber and boundary apparatus of the bale-forming chamber, which can be moved into an open position for ejecting a completed bale. The axial dimensions of the bale-forming chamber can be changed by at least one side wall that can be moved by means of an adjustment drive. The adjustment drive is configured such that the axial dimensions of the bale-forming chamber initially increase during the ejection of the bale relative to the dimensions provided for forming the bale and then (still during the ejection of the bale) are reduced again.

In this way, it is achieved that the clamping force of the side wall on the bale during the ejection is initially reduced relative to the clamping force while forming the bale and then is increased again. In this way, the bale can begin its rolling motion out of the bale-forming chamber at first without great braking, so that it does not remain stuck in the bale-forming chamber, and it is then braked by the side wall. Therefore, there is no longer the risk or there is a reduced risk of damage to the wrapping material while rolling down the unloading ramp, which makes it possible to shape the unloading ramp simpler than before. In addition, the bale no longer rolls too far away from the round baler.

The adjustment drive can be coupled with the boundary apparatus, i.e., can be controlled by this, so that the position of the side wall depends on the position of the boundary apparatus, which, in turn, specifies the position of the bale. It would also be conceivable, however, to control the adjustment drive directly as a function of the position of the bale detected by means of a sensor.

The coupling between the boundary apparatus and the adjustment drive can be realized in an arbitrary way, e.g., by a mechanical coupling, as described below, or by an electronic coupling between an actuator for moving the boundary apparatus on one side and an actuator for actuating the adjustment drive on the other side, analogous to DE 10 2007 012 174 A1. In this case, the actuator can control the adjustment drive such that the side wall assumes a position that is dependent on the position of the boundary apparatus or exerts on the bale a friction force that is dependent on this position and is detected by a sensor.

In particular, the boundary apparatus could include a pivoting part that carries means for forming a bale in the bale-forming chamber and can move rotatably between a bale-forming position and a bale ejection position. In a different embodiment, the boundary apparatus could also be constructed as a door (cf. U.S. Pat. No. 4,334,467 A1).

The pivoting part is preferably connected at a distance from its rotational axis to a control element that interacts with a double wedge-shaped control surface of the side wall. Multiple control elements and control surfaces could also be provided that are arranged at different distances from the rotational axis of the pivoting part.

BRIEF DESCRIPTION OF THE DRAWINGS

An embodiment of the disclosure is described in more detail below and shown in the drawings. Shown are.

DETAILED DESCRIPTION

Figure 1:
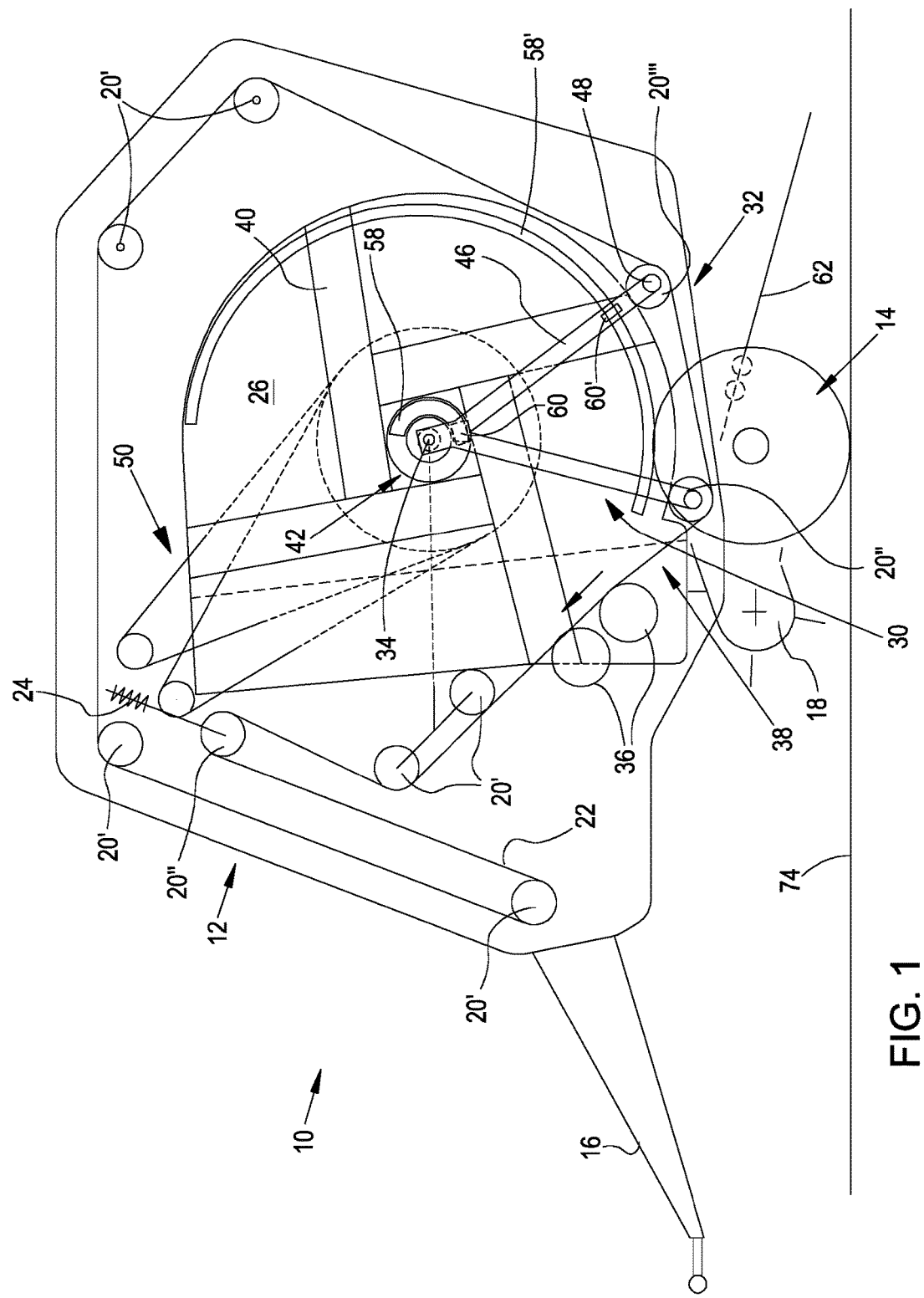
FIG. 1 a round baler according to the disclosure in a lateral view in a closed position and schematic representation, FIG. 2 the round baler according to FIG. 1 in a view from behind and in schematic representation, and FIG. 3 an enlarged representation of the inner adjustment drive 32.

A round baler 10 shown in FIG. 1 includes a frame 12, a chassis 14, a tow bar 16, a pick-up device 18, rollers 20, pressing elements 22, a tensioning device 24, side walls 26, a bale-forming chamber 28, pivoting parts 30, and an adjustment drive 32.

The round baler 10 is provided in the shown embodiment with a variable size bale-forming chamber 28, but could also be provided with a constant size bale-forming chamber 28. In the bale-forming chamber 28, harvested produce picked up from the ground is formed into a so-called round bale that presses with its end sides on the side walls 26.

Figure 2:
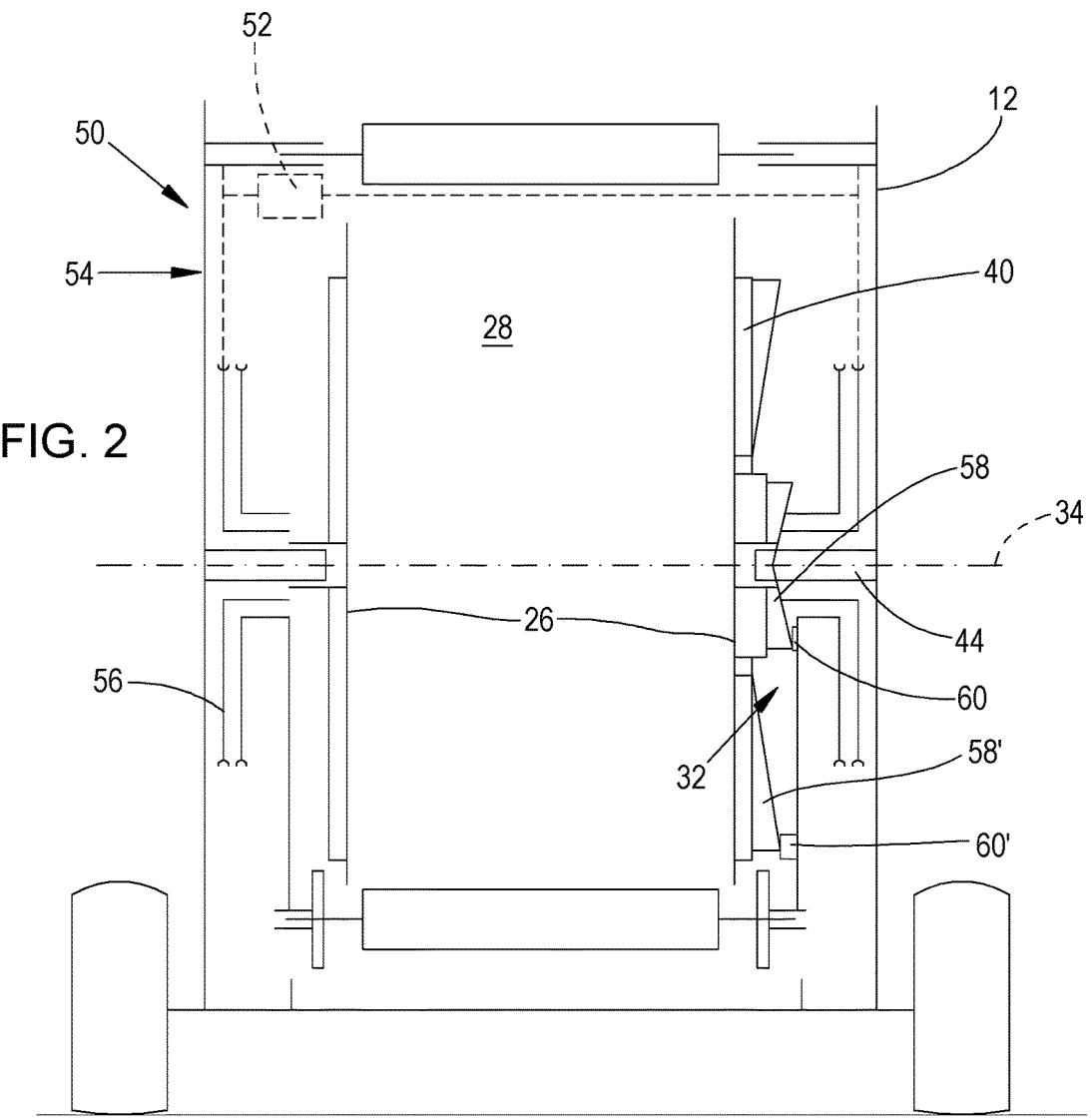

The frame 12 is especially easy to see in FIG. 2 and represents a welded and/or threaded assembly on which all of the components of the round baler 10 are mounted. The frame is supported on the chassis 14 and can be connected with the tow bar 16 to a tractor, not-shown. The frame 12 carries, among other things, cover parts, not-shown, some of the rollers 20, the side walls 26, and the pivoting parts 30. The frame 12 amply surrounds the area enclosed by the side walls 26 and the pressing elements 22.

The chassis 14 consists of an axle and wheels, in a way that is not described in more detail, on which the frame 12 contacts. The tow bar 16 attaches to the front side of the frame 12 in a rigid or height-adjustable way. The pick-up device 18 is typically constructed as a so-called pick-up and is attached to the frame 12 in a height-adjustable way. The pick-up device 18 can also be arranged downstream of a known cutting device. The pick-up device 18 picks up produce on the ground and forwards it via an optionally provided cutting device into the bale-forming chamber 28, where it is shaped into a cylindrical round bale.

Some of the rollers 20 are supported so that they can rotate fixed in place in the frame 12 and are designated with 20', one of the other rollers 20 can be moved against the force of a spring that is not described in more detail so that the pressing elements 22 can yield to the increasing bale diameter, and is designated with 20''; each of the other rollers 20 can be pivoted above a pivoting axis 34 on pivoting parts 30. These rollers 20 are designated with 20''' and have wide constructions, run parallel to each other, and are arranged such that the pressing elements 22 can run over these rollers and enclose the bale-forming chamber 28. In addition to the rollers 20 there are also cylinders 36 that are located above an inlet opening 38 into the bale-forming chamber 28, which operate as so-called starter rollers at the beginning of the bale formation, and on which a part of the weight of the round bale can be supported.

The pressing elements 22 are constructed as belts that run parallel to each other and essentially cover the bale-forming chamber 28 over its width. Instead of the construction as a belt, a construction as a belt-and-slat conveyor or as a wide belt could also be selected, as is also known; in this case, only one pressing element would be present, which, however, shall also be included within the scope of protection. The pressing elements 22 are endless and are therefore set into revolving motion such that they form a friction-fit contact on at least one drivable roller 20. The pressing elements 22 form, in the area of the inlet opening 38, a bridge that is formed into an inward expanding loop with increasing amount of harvested produce and surrounds the round bale. The pressing elements 22 are therefore held under tension such that they are guided over the position-changing roller 20'.

The tensioning device 24 is formed in a known way such that the roller 20'' is guided on a not-shown arm, sled, or the like against the force of the spring and always keeps a loop of the pressing elements 22 in tension.

The side walls 26 essentially assume the shape of a "D" in a view of FIG. 1, wherein the rear end area at the right in FIG. 1 forms an arc that essentially follows the circumferential line of the completed round bale, i.e., on a part of a circular arc. The side walls 26 basically have a one-piece construction, i.e., they are divided not like in conventional round balers along an approximately central vertical plane, but instead they can be formed from multiple parts. From FIG. 2 it emerges that the side walls 26 assume a not insignificant distance to the frame 12 and thus can be deflected outward, as is described below. The side walls 26 have a construction that is resistant to bending by means of reinforcing braces 40, wherein the reinforcing braces 40 can be screwed on or welded on. According to the illustration in FIG. 2, the reinforcing braces 40 have an approximately star-shaped profile with respect to the pivoting axis 34 and run tangentially past this axis at a slight distance, in order to ultimately meet each other at more or less of a right angle. Due to this profile, they enclose a chamber 42 that is rectangular in this embodiment. In its front end area, the side walls 26 are connected essentially rigidly to the frame 12; however, a slight pivoting motion starting from a position according to FIG. 2 by a few degrees outward is possible such that either the side walls 26 are formed in the connection area, e.g., are made from a flexible plate or are fixed in a flexible connection, e.g., to a flexible flange or spring-loaded screws. The connection of the side walls 26 on the frame 12 takes place essentially along a more or less vertical line on the front end of the bale-forming chamber 28. In the area of the pivoting axis 34, each side wall 26 is guided on an axle 44 that is rigidly attached to the frame 12 and simultaneously acts as the pivoting axis for the pivoting parts 30.

The bale-forming chamber 28 is variable in its size and is bounded at the beginning, i.e., for an empty bale-forming chamber 28, by an approximately triangular, cylindrical space between the pick-up device 18 and the pressing apparatus 22 and laterally by the side walls 26. With the increased feeding of harvested produce, the bale-forming chamber 28 is expanded and ultimately assumes a cross section that follows the shape of the side walls 26 in the rear area.

The pivoting parts 30 are provided in this embodiment on each side with one or more arms 46 running radial to the pivoting axis 34 and one or more crossbeams 48 that are attached on its/their radially outer end and run perpendicular thereto. On the end of each crossbeam 48, there is a roller 20'''. The pivoting parts 30 are arranged on the axle 44 so that they can pivot with the radially inner end of each arm 46. The position of the arms 46 is controlled by means of a drive 50 that contains a motor 52, and for each pivoting part 30, a traction gear 54 or another kind of pivoting drive. The motor 52 can be braked in each of its positions and hold the arms 46 fixed in place accordingly. Driven wheels 56 allocated to each of the traction gears 54 are supported concentric to each other and to the axle 44 and are each connected locked in rotation with a pivoting part 30. The control of the pivoting parts 30 is realized such that the front pivoting part 30 is moved during the bale-forming phase in order to help with the formation of a bale core, and the rear pivoting part 30 assumes a lower position while the round bale is formed and an upper position when it is ejected. The rear pivoting part 30 is thus used as boundary apparatus of the bale-forming chamber 28 that can be moved into an open position for ejecting a completed bale. The lower end position of the rear pivoting part 30 is shown in FIG. 1, while it is pivoted upward by approximately 180° into its upper end position. It is noted that the front pivoting part 30 is not absolutely required or could be connected rigidly to the rear pivoting part 30.

Figure 3:
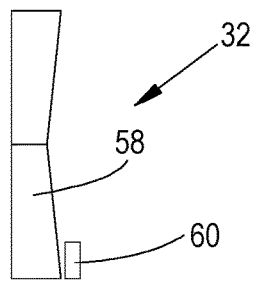

The adjustment drive 32 contains a control surface 58 that rises and then falls again (i.e., double-wedge-shaped) and a control element 60 (cf. FIG. 3) and is used for and during the ejection of the round bale to initially lower the pressure and thus the friction of the side walls 26 on its end faces, so that the round bale can be unloaded more easily out of the bale-forming chamber 28, and then can be increased again in order to brake it.

The control surface 58 is positioned on a circular arc running concentric to the pivoting axis 34 and is mounted on the outer side of both side walls 26, if it were also sufficient to provide only one rising surface, i.e., on one side wall 26. In the present embodiment, the control surface 58 is formed from a bent, steel double wedge that is screwed onto the side walls 26 falling and rising equally within the chamber 42.

An additional control surface 58' is located farther outside on a larger circular arc and mounted on the outside of both side walls 26, if it were also sufficient to provide only one rising surface, i.e., on one side wall 26. In the present embodiment, the additional control surface 58' is formed from a bent steel double wedge that is screwed onto the side walls 26 falling and rising equally within the chamber 42.

The control element 60 interacting with the control surface 58 is provided on the side of the arm 46 of the rear pivoting part 30 toward the longitudinal center plane of the round baler 10 and constructed as a sliding surface. For minimizing the friction, the friction surfaces are lubricated; alternatively, the control element 60 could also be constructed as a wheel, roller, ball, or similar rotating element. The control element 60 is arranged such that it describes a round circular path for rotation of the pivoting part 30 about the pivoting axis 34 and moves on the control surface 58. Preferably, the control element is always in contact on the control surface 58.

A control element 60' interacting with the additional control surface 58' is provided on the side of the arm 46 of the rear pivoting part 30 toward the longitudinal center plane of the round baler 10 in the vicinity of its radially outer end and is constructed as a sliding surface. For minimizing the friction, the friction surfaces are lubricated; alternatively, the control element 60 could also be constructed as a wheel, roller, ball, or similar rotating element. The additional control element 60 is arranged such that it describes a round circular path for rotation of the pivoting part 30 about the pivoting axis 34 and moves on the additional control surface 58'. Preferably, the control element 60 is always in contact on the additional control surface 58'.

The control elements 60, 60' lie on the highest elevation of the control surfaces 58, 58', if the rear pivoting parts 30 are located in their lower end position—cf. FIG. 1—and the round bale can be formed. If the pivoting parts 30 are moved into their center position, in which the round bale begins its movement out of the bale-forming chamber 28, the control element 60, 60' moves to the lowest position of the control surfaces 58, 58'. If the pivoting parts 30 are moved into their upper position, in which the round bale continues its movement out of the bale-forming chamber 28 and exits the bale-forming chamber 28, the control elements 60, 60' are moved toward a higher position of the rising control surfaces 58, 58', whose height agrees with the lower pivoting position or can be somewhat lower or even higher, in order to brake the bale, because it reaches an unloading ramp 62.

As soon as a round bale is formed in the bale-forming chamber 28, the rear pivoting part 30 is raised, whereupon the side walls 26 move outward due to the pressure in the bale-forming chamber 28 from the pressed harvested produce. Consequently, the friction is reduced between the inner side of the side walls 26 and the end faces of the round bale and the bale begins to roll out from the bale-forming chamber 28 due to the force of gravity in the direction toward the unloading ramp 62. Shortly afterward, the side walls 26 are brought back together again and the bale is braked, before this reaches the unloading ramp 62. As soon as the round bale has completely exited the bale-forming chamber 28 and the round baler 10 has been moved farther such that the rear pivoting part 30 can be lowered again, a pivoting movement of the rear pivoting part 30 is realized in the opposite direction, so that the control element 60', 60' is moved toward the smallest and ultimately toward the largest elevation of the rising surfaces 58, 58, and in this way presses the side walls 26 outward and then inward and a new bale can be formed.

The invention claimed is:

1. A round baler comprising:
   a bale-forming chamber, an adjustment drive, and a boundary apparatus of the bale-forming chamber that can be moved into an open position for ejecting a completed bale, the boundary apparatus comprises a pivoting part rotatable between a first position, a second position and a third position, the pivoting part located in the first position when the bale is forming, the pivoting part located in the second position when the bale begins its movement out of the bale-forming chamber, and the pivoting part located in the third position when the bale exits the bale-forming chamber,
   wherein:
   an axial dimension of the bale-forming chamber is configured to change by at least one side wall of the baler-forming chamber, which is moved by the adjustment drive, the adjustment drive is coupled with the boundary apparatus;
   and the adjustment drive is configured to move the at least one side wall such that the axial dimension of the bale-forming chamber increases when the pivoting part rotates to the second position and then the axial dimension of the bale-forming chamber reduces when the pivoting part rotates to the third position to brake the bale as it exits the bale-forming chamber.

2. The round baler of claim 1, wherein the pivoting part carries one or more rollers for forming a bale in the bale-forming chamber.

3. The round baler of claim 2, wherein the pivoting part is connected at a distance from its rotational axis to a control element that interacts with a double-wedge-shaped control surface of the side wall.

4. The round baler of claim 3, wherein multiple control elements and control surfaces are provided that are arranged at different distances from the rotational axis of the pivoting part, each control element respectively interacting with one of the control surfaces.

5. The round baler of claim 1, wherein the first position is the pivoting part located in its lower end position.

6. The round baler of claim 1, wherein the second position is the pivoting part located in its center position.

7. The round baler of claim 1, wherein the third position is the pivoting part located in its upper position.

8. The round baler of claim 1, wherein the first position of the pivoting part is a lowered position, the second position is a partially raised position, and the third position is a raised position.

9. A device for changing an axial dimension of a bale-forming chamber of a round baler for forming and ejecting a bale, comprising:
- a side wall that is deflectable inward and outward along a pivoting axis;
- at least one control surface, positioned on a circular arc concentric to the pivoting axis and mounted on an outer side of the side wall of the bale-forming chamber, the at least one control surface comprising a first portion, a second portion, and a third portion, the first portion and the third portion positioned axially outward of the second portion;
- a pivoting part comprising at least one control element interacting with the control surface, the pivoting part rotating about the pivoting axis between a first position, a second position and a third position; and wherein
- the pivoting part located in the first position with the at least one control element contacting the first portion of the at least one control surface when the bale is forming, the pivoting part located in the second position with the at least one control element contacting the second portion of the at least one control surface to increase the axial dimension of the bale-forming chamber when the bale begins its movement out of the bale-forming chamber, and the pivoting part located in the third position with the at least one control element contacting the third portion of the at least one control surface to reduce the axial dimension of the bale-forming chamber when the bale exits the bale-forming chamber to brake the bale as it exits the bale-forming chamber.

10. The device for changing an axial dimension of a bale-forming chamber of a round baler for forming and ejecting a bale of claim 9, wherein the at least one control surface comprising a first control surface positioned on a first circular arc and a second control surface positioned on a second circular arc, the at least one control element comprising a first control element and second control element, the first control element interacts with the first control surface, and the second control element interacts with the second control surface.

11. The device for changing an axial dimension of a bale-forming chamber of a round baler for forming and ejecting a bale of claim 10, wherein a distance between the second control element and the pivoting axis is longer than a distance between the first control element and the pivoting axis.

12. The device for changing an axial dimension of a bale-forming chamber of a round baler for forming and ejecting a bale of claim 10, wherein a radius of the second circular arc is longer than a radius of the first circular arc.

13. The device for changing an axial dimension of a bale-forming chamber of a round baler for forming and ejecting a bale of claim 9, wherein the at least one control element always contacts the at least one control surface.

14. The device for changing an axial dimension of a bale-forming chamber of a round baler for forming and ejecting a bale of claim 9, wherein the first portion of the control surface and the third portion of the control surface are positioned equally outward.

15. The device for changing an axial dimension of a bale-forming chamber of a round baler for forming and ejecting a bale of claim 9, wherein the pivoting part carries one or more rollers for forming the bale in the bale-forming chamber.

16. The device for changing an axial dimension of a bale-forming chamber of a round baler for forming and ejecting a bale of claim 9, wherein the first position is the pivoting part located in its lower end position.

17. The device for changing an axial dimension of a bale-forming chamber of a round baler for forming and ejecting a bale of claim 9, wherein the second position is the pivoting part located in its center position.

18. The device for changing an axial dimension of a bale-forming chamber of a round baler for forming and ejecting a bale of claim 9, wherein the third position is the pivoting part located in its upper position.

19. The device for changing an axial dimension of a bale-forming chamber of a round baler for forming and ejecting a bale of claim 9, wherein a degree between the pivoting part in the first position and the pivoting part in the third position is approximately 180°.

* * * * *